UNITED STATES PATENT OFFICE 1,972,454

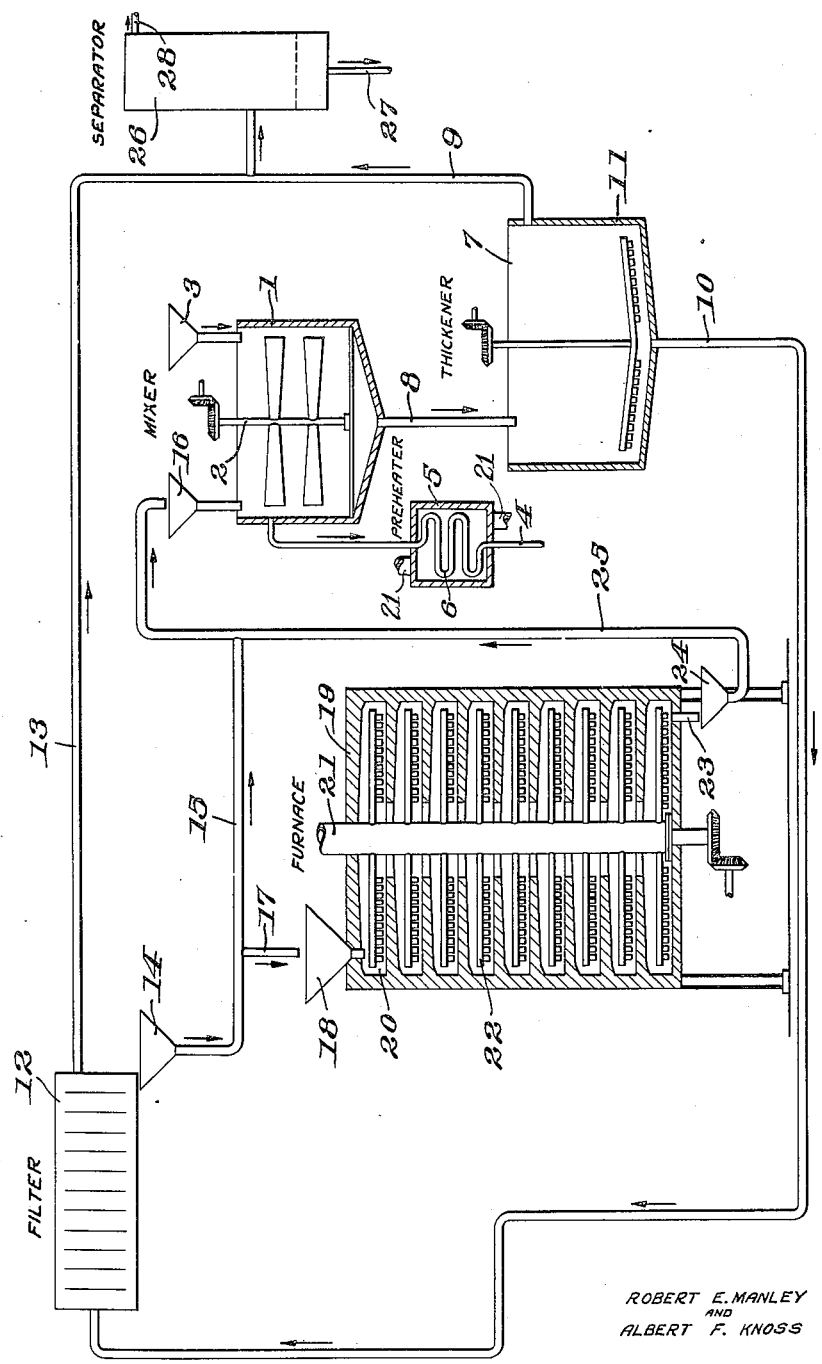

DEHYDRATING OIL

Robert E. Manley and Albert F. Knoss, Beacon, N. Y., assignors to The Texas Company, New York, N. Y., a corporation of Delaware Application December 26, 1931, Serial No. 583,328

8 Claims. (Cl. 196—4)

This invention relates to dehydrating oil and has to do particularly with improvements in separating the phases of oil-containing emulsions with filtering material.

The invention, although not limited in scope to any particular oil-containing emulsions, has a more important application in the treatment of petroleum or mineral oil emulsions occurring in nature or in refinery practice. Emulsions of this type comprise bottom settlings from crude oil and emulsions or bottom settlings of various fractions of petroleum, such as, fuel oil, paraffin slop, coke still distillate, cracked or straight run gas oils, lubricating oil distillates and emulsions of any other products obtained in refinery processes.

Heretofore emulsions have been filtered to effect separation into the phases, and to aid in the filtration and the agglomeration of the emulsifying agents the filter leaves have been coated with a porous de-emulsifying agent. The chief disadvantages of the prior methods, however, have been the excessive volume of liquids often necessary to be filtered and also the large quantity of de-emulsifying agent consumed. These disadvantages are largely overcome in the present invention by concentrating the emulsified material prior to filtration and by recovering the solid de-emulsifying agent, as more fully described hereinafter.

According to the present invention, the emulsion is intimately mixed with a de-emulsifying agent, consisting preferably of a filter aid material, and the resulting mixture subjected to a thickening operation whereby a substantial amount of de-emulsified liquids may be decanted and the filter aid concentrated in the unbroken emulsified portion of the mixture, and in the water layer. The thickened emulsified portion is then conducted to a filter and in the filtration operation the emulsifying agents are substantially removed along with the filter aid, and a potentially de-emulsified filtrate recovered. The solids separated during filtration may be conveniently roasted in a furnace to recover the filter aid and the recovered material used over again for treatment of a fresh charge of emulsion.

For purposes of illustration, reference will now be had to the drawing which illustrates one form of apparatus for carrying out our improved process.

Referring to the drawing, the reference character 1 represents a mixer for intimately mixing filter aid with the emulsion to be treated. The mixer is equipped with a suitable stirring or agitating means 2, which may comprise paddles attached to a rotatable shaft or any other suitable type of stirring mechanism. A hopper or funnel 3 is adapted to introduce filter aid or other porous de-emulsifying agent into the mixer 1. A pipe 4 connected to a source of supply (not shown) serves to charge fresh emulsion to the mixer. Interposed in the line 4 is a preheater 5 for heating the emulsion prior to commingling the filter aid therewith.

The preheater may be any well known type, such as a direct fire furnace or a steam heat exchanger; however, it is preferable that it take the form of an economizer through which the flue gases from the furnace, referred to hereinafter, are passed and the heat of the hot flue gases absorbed by indirect heat exchange with the emulsion flowing through the tubular coil 6.

A thickener 7 is adapted to receive through a line 8 the mixture of emulsion and filter aid from the mixer. The thickener is preferably of the Dorr type in which the clear liquids overflow or are decanted from the top through a line 9, while the solids are concentrated at the bottom and raked toward the discharge line 10, by the revolving rakes or scrapers 11. The line 10 serves to conduct the thickened emulsion and solids discharged from the bottom of the thickener, to a filter press 12.

The filter 12 is preferably an ordinary leaf-type press, for example, a Kelly or Sweetland, in which the filter aid and solid emulsifying agents collect on the leaves while the filtrate, comprising potentially de-emulsified liquids, passes through the leaves to be discharged through the line 13. Solids collecting on the leaves may be removed intermittently therefrom and discharged into the hopper or other collecting means 14, which is adapted to transfer the solids to a suitable conveyor 15. The conveyor 15 serves to transport the filter cake and to discharge it through the hopper 16 into the mixer 1 to be mixed with fresh emulsions for further treatment in the system. A branch conveyor 17 serves to conduct any or all of the solids separated in the filter 12 to a funnel or hopper 18, which is adapted to transfer the solids therein to a furnace 19.

The furnace 19 may be any well known type for roasting clay, fuller's earth or similar materials. However, for convenience, it is shown as a multiple hearth type, for example, a Herreschof furnace. A series of horizontal hearths 20 are located at spaced intervals in the furnace on which the solids are spread to be roasted by the heat of combustion products passing upward through the stack 21. Armed rakes spread the solids on the hearth and gradually move them toward the center to fall to the succeeding hearths below. At the bottom of the furnace is an outlet 23 through which the recovered or roasted filter aid is dumped into the hopper 24. Connected to the hopper 24 is a conveyor 25 through which the solids are conveyed to the hopper 16, connected with the mixer 1.

As referred to heretofore, the flue gases from the stack 21 may be passed to an economizer and the heat of the gases utilized to preheat the fresh emulsion. For such purpose, the stack 21, for example, may be connected with the preheater 5 and the hot combustion gases passed over the tubular coil 6 to transfer heat to the emulsion passing therethrough.

The filtrate line 13 connects with a separator 26, to which the overflow line 9 from the thickener is also in communication. This separator may be an ordinary tank with a water drain line 27 and a dehydrated oil drain-off line 28.

The drawing is obviously diagrammatic, and it will be understood that structural details such as valves and pumps, which are contemplated, have been intentionally omitted for purposes of simplification. Also it is to be understood that the mixer, thickener, funnels and any other parts of the apparatus, which are shown diagrammatically as open to the atmosphere, are intended to be provided with coverings or other provision made to maintain a closed system when working with volatile oils, to prevent evaporation.

In practicing the invention with apparatus such as that just described, the emulsion is charged to the preheater wherein it is raised to a temperature of about 160-200° F. and preferably around 180° F. The preheated emulsion is then transferred to the mixer 1 wherein it is intimately mixed with approximately 5-15 lbs. per barrel of comminuted or powdered filter aid material.

The filter aid material suitable for use in the process of the invention may be any of a number of such agents known in the art. It is advantageous that one be selected however, which may perform both the functions of a demulsifying agent and a filter aid. Such agents comprise diatomaceous earth, fuller's earth, natural or treated clays and Filter Cel. A sample of kieselguhr, known in the trade as "Super-Cel", when used in the amount of about nine pounds per barrel of untreated emulsion has been found to function particularly well for the purpose.

The mixture of filter aid and the emulsion after thorough agitation or stirring in the mixer, is passed through the line 8, to the thickener 7. In the thickener the mixture is allowed to become relatively quiescent in order to permit the liquids broken out from the emulsion to collect at the top so that the clear supernatant liquids may be decanted through the line 9. The solids which settle to the bottom become concentrated in the unbroken emulsion and water layer, and the thickened mass in the form of slime or paste is scraped to the center by the rakes 11 and finally withdrawn through a line or conveyor 10. In some instances the thickening operation may be eliminated and the material from the mixer 1 passed directly through the line 10 to the filter.

The filtering operation is carried out so that the filter aid collects on the leaves of the filter to form a porous coat which remains substantially permeable to the liquid filtering therethrough. The filter may be selected from any of the well known continuous or semi-continuous filter presses. The Kelly and Sweetland presses have been found to work particularly well for the purpose herein set forth. The filtrate is passed through the line 13, to be handled as set forth more particularly hereinafter. The filtering material and solid emulsifying agents collecting on the leaves of the press are removed and dumped into the hopper 14 which is in communication with conveyor 15. The filtered materials collected in the hopper 14 may be returned directly to the mixer 1 to be re-used for treating fresh emulsion. The latter procedure is adaptable when the filter aid remains substantially unchanged, or is only slightly contaminated by impurities separated from the emulsion.

According to one method of operation the solids filtered out in the filter press, all or in part, are passed through a branch conveyor 17, communicating with the conveyor 15. The solids are dumped by the branch conveyor 17 into the hopper 18 from which they are fed into the furnace. As mentioned heretofore, the furnace is preferably a multiple hearth type, for example an Herreschof furnace. The solids are spread over the hearth and as they move down through the furnace the volatile and combustible material is burned or driven off, and the material recovered at the bottom in the hopper 24 is a relatively pure material, similar to the fresh filter aid added to the mixer through the hopper 3. The recovered filter aid is conducted by the conveyor 25 back to the mixer for re-use. A good grade of "Filter Cel" or other filtering material may be re-used an indefinite number of times, so that the consumption thereof is relatively small.

The filtrate passing through the line 13 and the liquids decanted from the thickener through the line 9 are potentially de-emulsified mixtures. These liquids are passed into the separator 26 and allowed to separate or stratify. The water may be drained through the line 27 and the dehydrated oil withdrawn through the line 28.

The term "potentially de-emulsified liquids" when referred to in the specifications means a mixture of liquids which are capable of separating or stratifying when allowed to stand. Thus the liquids which result when the emulsion is broken, or when the emulsifying agents are removed by filtration, may comprise an unstable emulsion which quickly separates or stratifies when the mixture is allowed to come to rest.

We claim:

1. The method of treating oil-containing emulsions which comprises preheating the emulsion to a temperature of about 160-200° F., intimately mixing with the preheated product a porous de-emulsifying agent, passing the resulting mixture to a thickener to produce a separation of de-emulsified liquids and to concentrate the solids and separately withdrawing a de-emulsified liquid and a concentrated suspension of solids in the unresolved emulsion from said thickener.

2. The method of treating oil-containing emulsions which comprises mixing a filter aid material with the emulsion, subjecting the resulting mixture to a thickening operation to separate de-emulsified liquids and to concentrate the filter aid in the unbroken emulsion, decanting said liquids and subjecting the unbroken emulsion with its content of filter aid material to filtration to effect de-emulsification thereof.

3. The method of treating oil-containing emulsions to produce de-emulsification thereof which comprises intimately mixing a filter aid material with the emulsion at a temperature sufficient to cause partial de-emulsification, passing the resulting mixture to a thickener wherein the de-emulsified liquids are decanted and the filter aid is concentrated in the unbroken emulsion, subjecting the unbroken emulsion with its content of filter aid material to filtration to produce a filtrate free from filter aid and solid emulsifying agents, and then separating the oil component of said filtrate.

4. The method of treating oil-containing emulsions which comprises forming a hot mixture of emulsion and a comminuted solid de-emulsifying agent comprising a solid de-emulsifying material recovered from a previous operation of treating oil-containing emulsions, subjecting the mixture to a thickening operation whereby a de-emulsified liquid layer and a concentrated suspension of said de-emulsifying agent in a portion of the emulsion liquids are formed, and separately withdrawing from the thickening operation said de-emulsified liquid layer and said suspension.

5. The method of treating oil-containing emulsions which comprises preheating the emulsion to a temperature sufficient to effect de-emulsification thereof when mixed with a solid de-emulsifying agent, commingling with the preheated emulsion a filter aid material comprising a roasted filter aid material recovered from a previous operation of de-emulsifying oil-containing emulsions, subjecting the resulting mixture to a thickening operation to produce a separation of potentially de-emulsified liquids and to concentrate the filter aid in the unresolved emulsion, and separately withdrawing from the thickening operation said potentially de-emulsified liquids, for separation into oil and water layers, and said suspension, for recovery of the filter aid material for further use in de-emulsifying operations.

6. The method of treating oil-containing emulsions which comprises preheating the emulsion to a temperature sufficient to effect de-emulsification thereof when mixed with a solid de-emulsifying agent, commingling with the preheated emulsion a comminuted solid de-emulsifying agent, subjecting the resulting mixture to a thickening operation to produce a separation of de-emulsified liquids and to separate the de-emulsifying agent in the form of a concentrated suspension thereof in de-emulsified liquids and unresolved emulsion, separately withdrawing from the thickening operation said suspension and a mixture of de-emulsified liquids substantially free from the de-emulsifying agent and then separating the components of said mixture.

7. The method of treating oil-containing emulsions to effect de-emulsification thereof which comprises intimately mixing a comminuted solid de-emulsifying agent with the emulsion at a temperature sufficient to effect substantial de-emulsification thereof, subjecting the resulting mixture to a thickening operation wherein the de-emulsifying agent is concentrated in the form of a suspension, withdrawing said suspension and separating the de-emulsifying agent therefrom, returning the separated de-emulsifying agent to the process to treat additional fresh emulsion, and removing de-emulsified liquids from the thickening operation.

8. The method of treating oil-containing emulsions to effect de-emulsification thereof which comprises intimately mixing a filter aid material with the emulsion at a temperature sufficient to effect substantial de-emulsification thereof, subjecting the resulting mixture to a thickening operation wherein a partial separation of de-emulsified liquids is effected and a concentrated suspension of the filter aid is produced, filtering said concentrated suspension to separate the filter aid from the remainder of the liquids and returning said filter aid separated in the filtering operation to the system to treat additional quantities of emulsion.

ROBERT E. MANLEY.
ALBERT F. KNOSS.